US009622234B2

(12) United States Patent
Takeda et al.

(10) Patent No.: US 9,622,234 B2
(45) Date of Patent: Apr. 11, 2017

(54) WIRELESS COMMUNICATION TERMINAL, BASE STATION DEVICE, AND RESOURCE ALLOCATION METHOD

(71) Applicant: Panasonic Intellectual Property Corporation of America, Torrance, CA (US)

(72) Inventors: Kazuki Takeda, Kanagawa (JP); Hidetoshi Suzuki, Kanagawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 9 days.

(21) Appl. No.: 14/421,755

(22) PCT Filed: Jul. 4, 2013

(86) PCT No.: PCT/JP2013/004161
§ 371 (c)(1),
(2) Date: Feb. 13, 2015

(87) PCT Pub. No.: WO2014/049918
PCT Pub. Date: Apr. 3, 2014

(65) Prior Publication Data
US 2015/0215907 A1 Jul. 30, 2015

(30) Foreign Application Priority Data

Sep. 27, 2012 (JP) .................................. 2012-214975

(51) Int. Cl.
*H04W 72/04* (2009.01)
*H04L 1/00* (2006.01)
(Continued)

(52) U.S. Cl.
CPC ......... *H04W 72/042* (2013.01); *H04L 1/0026* (2013.01); *H04L 1/1854* (2013.01); *H04L 5/0055* (2013.01); *H04L 5/0007* (2013.01)

(58) Field of Classification Search
None
See application file for complete search history.

(56) References Cited

U.S. PATENT DOCUMENTS

2010/0177694 A1* 7/2010 Yang ................. H04W 74/0833
370/328
2011/0268062 A1* 11/2011 Ji .......................... H04L 5/0055
370/329
(Continued)

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 8 pages.
(Continued)

*Primary Examiner* — Christine Duong
(74) *Attorney, Agent, or Firm* — Seed IP Law Group LLP

(57) ABSTRACT

Provided is a wireless communication terminal such that, in a system in which E-PDCCH control information is transmitted, flexible frequency scheduling for the E-PDCCH control information for a plurality of terminals can be performed by restricting ACK/NACK scheduling, while an upstream data resource is ensured. The wireless communication terminal is provided with: a reception unit that receives a control signal via an extended physical downstream control channel; a control unit that determines an ACK/NACK resource for transmitting an ACK/NACK signal on the basis of an association rule such that, in the extended physical downstream control channel transmitting each extended control channel element in a single frequency resource block, arbitrary successive numbers of ACK/
(Continued)

NACK resources correspond to the extended control channel elements contained in different frequency resource blocks; and a transmission unit that transmits the ACK/NACK signal by using the determined ACK/NACK resource.

18 Claims, 16 Drawing Sheets

(51) Int. Cl.
  *H04L 1/18* (2006.01)
  *H04L 5/00* (2006.01)

(56) References Cited

U.S. PATENT DOCUMENTS

| | | | |
|---|---|---|---|
| 2013/0064196 A1* | 3/2013 | Gao | H04L 5/0016 370/329 |
| 2013/0242890 A1* | 9/2013 | He | H04W 52/243 370/329 |

OTHER PUBLICATIONS

Ericsson, ST-Ericsson, "PUCCH resource allocation for ePDCCH," R1-123870, 3GPP TSG-RAN WG1 Meeting #70, Agenda Item: 7.6.6, Qingdao, China, Aug. 13-17, 2012, 3 pages.

ETSI TS 136 212 V10.4.0, "LTE; Evolved Universal Terrestrial Radio Access (E-UTRA); Multiplexing and channel coding (3GPP TS 36.212 Version 10.4.0 Release 10)," Jan. 2012, 81 pages.

ETSI TS 136 213 V10.4.0, "LTE; Evolved Universal Terrestrial Radio Access (E-UTRA); Physical layer procedures, (3GPP TS 36.213 Version 10.4.0 Release 10)," Jan. 2012, 127 pages.

International Search Report dated Aug. 27, 2013, for corresponding International Application No. PCT/JP2013/004161, 2 pages.

Research in Motion, UK Limited, "PUCCH Resource Efficiency for E-PDCCH," R1-123623, 3GPP TSG RAN WG1 Meeting #70, Agenda Item: 7.6.6, Qingdao, China, Aug. 13-17, 2012, 6 pages.

ZTE Corporation, "PUCCH resource allocation for ePDCCH," R1-123850, 3GPP TSG RAN WG1 Meeting #70, Agenda Item: 7.6.4, Qingdao, China, Aug. 13-17, 2012, 4 pages.

* cited by examiner

WIRELESS COMMUNICATION TERMINAL, BASE STATION DEVICE, AND RESOURCE ALLOCATION METHOD

TECHNICAL FIELD

The present invention relates to a radio communication terminal, a base station apparatus, and a resource allocation method.

BACKGROUND ART

The 3GPP (3rd Generation Partnership Project Radio Access Network) has established LTE (Long Term Evolution) Rel. 8 (Release 8) and the extended version of LTE, which is LTE Rel. 10 (LTE-Advanced). In these standards, a base station, and a radio communication terminal (also called "UE (User Equipment)" and referred to below as a "terminal") transmit control information for transmitting and receiving data using a downlink PDCCH (physical downlink control channel) (refer to Non-Patent Literature (hereinafter, referred to as "NPL") 1 to 3). FIG. 1 shows the subframe configuration of the downlink. In the subframes, the PDCCH that transmits a control signal and the PDSCH (physical downlink shared channel) that transmits a data signal are time-division multiplexed. The terminal first decodes the control information transmitted to the terminal through the PDCCH and obtains information regarding a frequency allocation required for data reception on the downlink, and adaptive control, for example. The terminal then decodes data for the terminal that is included in the PDSCH, based on the control information. If control information that permits data transmission on the uplink is included in the PDCCH, the terminal transmits data on the PUSCH (physical uplink shared channel) of the uplink, based on the control information.

For downlink data transmission and reception, an HARQ (hybrid automatic request) combining error correction decoding and an automatic retransmission request has been introduced. After performing error correction decoding, the terminal determines whether or not the data is correctly decoded, based on a CRC (cyclic redundancy checksum) added to the data. If the decoding is successful, the terminal feeds back an ACK to the base station. If, however, the decoding fails, the terminal feeds back a NACK to the base station, prompting retransmission of the data in which an error is detected. The feedback of ACK/NACK (acknowledge response; hereinafter referred to as "A/N") is transmitted in the uplink. If no data is assigned to the PUSCH at the time of transmission, A/N is transmitted on the PUCCH (physical uplink control channel). If, however, data is assigned to the PUSCH at the time of A/N transmission, A/N is transmitted on either the PUCCH or the PUSCH. When this is done, the base station instructs the terminal beforehand as to whether transmission is to be done on PUCCH or PUSCH. FIG. 2 shows the uplink subframe configuration that includes PUSCH and PUCCH.

If A/N is transmitted on PUCCH, there are situations to be handled differently. For example, if the A/N transmission overlaps with the feedback of CSI (channel state information) periodically transmitted in the uplink, the PUCCH format 2a/2b is used. On the downlink, if carrier aggregation in which transmission is performed using a plurality of carriers that are bundled together is set to ON, and also the number of carriers is at least three, PUCCH format 3 is used. However, regardless of whether carrier aggregation is OFF or ON, if the number of carriers is two or fewer and there is no control information to be transmitted other than A/N and other than an uplink scheduling request, PUCCH format 1a/1b is used. In considering that downlink data is transmitted more frequently than uplink data, and also considering that the period of CSI feedback is not more frequent than the period of downlink data assignment, A/N is most often transmitted by the PUCCH format 1a/1b. The following description will focus on the PUCCH format 1a/1b.

FIG. 3 shows the slot configuration of the PUCCH format 1a/1b. The A/N signals transmitted by a plurality of terminals are spread by the Walsh sequence having a length-4 sequence and a DFT (discrete Fourier transform) sequence having a length-3 sequence and are code multiplexed and received at the base station. In FIG. 3, ($W_0$, $W_1$, $W_2$, $W_3$) and ($F_0$, $F_1$, $F_2$) represent, respectively, the above-noted Walsh sequence and DFT sequence. At the terminal, a signal representing either ACK or NACK first undergoes primary spreading to frequency components corresponding to 1 SC-FDMA symbols by a ZAC (zero auto-correlation) sequence (with a subcarrier having a length-12 sequence) in the frequency domain. That is, a ZAC sequence having a sequence length of 12 is multiplied by an A/N signal component represented by a complex number. Then, the A/N signal after primary spreading and the ZAC sequence as a reference signal undergo secondary spreading by a Walsh sequence ($W_0$ to $W_3$ of a length-4 sequence, also called a Walsh code sequence) and a DFT sequence ($F_0$ to $F_2$ of a length-3 sequence). That is, each component of a signal having a length-12 sequence (an A/N signal after primary spreading or a ZAC sequence (reference signal sequence)) is multiplied by each component of an orthogonal sequence (for example, a Walsh sequence or a DFT sequence). Additionally, the signal after secondary spreading is converted by an IFFT (inverse fast Fourier transform) to a length-12 sequence (subcarrier) signal in the time domain. Then, a CP (cyclic prefix) is added to each signal after the IFFT, thereby forming a one-slot signal made up of seven SC-FDMA symbols.

A/N signals from different terminals having different cyclic shift indexes are spread using a ZAC sequence corresponding to different cyclic shift indexes and an orthogonal code sequence corresponding to different orthogonal cover indexes (OC indexes). The orthogonal code sequence is a set of a Walsh sequence and a DFT sequence. The orthogonal code sequence is also called a block-wise spreading code sequence. Therefore, by using the conventional despreading and correlation processing, the base station can demultiplex the plurality of A/N signals that have been code multiplexed and cyclic shift multiplexed. Because there is a limit to the number of A/N signals that can be code multiplexed and cyclic shift multiplexed per frequency resource block (RB), if the number of terminals becomes large, frequency multiplexing is performed using different RBs. In the following, the code-RB resource in which A/N is transmitted will be called the A/N resource. The A/N resource number is determined by the RB number in which A/N is transmitted and the code number and cyclic shift value in the RB. Because multiplexing by cyclic shifting of the ZAC sequence can be considered as a type of code multiplexing, there will be cases in which orthogonal code and cyclic shift will be collectively called code in the following description.

In LTE, in order to reduce interference from other cells on the PUCCH, the ZAC sequence to be used is determined based on the cell ID. Because the mutual correlation between different ZAC sequences is small, by using different ZAC sequences between different cells, the interference can be reduced. Also, in the same manner, sequence hopping and cyclic shift hopping based on the cell ID has been introduced. With this hopping, shifting is done cyclically in units of SC-FDMA symbols, using a cyclic shift hopping pattern determined based on the cell ID, while mutual correlation on the cyclic shift domain and orthogonal code domain are maintained. Doing this enables randomization of combinations of A/N signals that are strongly interfered by other cells, while the mutual orthogonal relationship between A/N signals are maintained within a cell, and also enables removal of continuous strong interference to only some of the terminals from other cells.

In the description to follow, the description will be of the case in which a ZAC sequence is used for primary spreading, and a block-wise spreading code sequence is used for secondary spreading. However, for the primary spreading, rather than using a ZAC sequence, sequences that are mutually separable by mutually different cyclic shift values may be used. For example, a GCL (Generalized Chirp Like) sequence, a CAZAC (constant amplitude zero auto correlation) sequence, a ZC (Zadoff-Chu) sequence, a PN sequence such as an M sequence or an orthogonal Gold code sequence, or a computer-generated random sequence having sharp auto correlation characteristics may be used for the primary spreading. As long as the sequence can be treated as being mutually orthogonal or substantially mutually orthogonal, any sequence can be used as a block-wise spreading code sequence for the secondary spreading. For example, a Walsh sequence or a Fourier sequence or the like can be used as a block-wise spreading code sequence for the secondary spreading.

In LTE, as a method of allocating different A/N resources to different terminals, allocation is used that is based on control information scheduling results of the PDCCH. That is, using the fact that PDCCH control information is not scheduled onto the same resources between a plurality of terminals, a one-to-one correspondence is established between the PDCCH resources and the PUCCH format 1a/1b A/N resources (hereinafter described simply as A/N resources). This will be described below in detail.

The PDCCH is made up of one or more L1/L2 CCH (L1/L2 control channel). Each L1/L2 CCH is made up of one or more CCEs (control channel elements). That is, a CCE is the basic unit of scheduling control information onto PDCCH. Also, when one L1/L2 CCH is made up of a plurality (2, 4, or 8) of CCEs, a plurality of continuous CCEs with a CCE having an even-numbered index as the origin is allocated to that L1/L2 CCH. The base station allocates an L1/L2 CCH to the terminal to which the resources are to be allocated, in accordance with the number of CCEs necessary for notification of control information to the subject terminal to which resources are to be allocated. The base station then schedules the control information onto the physical resources corresponding to the CCE of that L1/L2 CCH. In this case, there is a one-to-one correspondence between each CCE and A/N resource. Therefore, a terminal that has received an L1/L2 CCH identifies the A/N resources corresponding to the CCEs making up that L1/L2CCH, and uses those resources (that is, codes and frequencies) to transmit the A/N signal to the base station. However, in the case of the L1/L2CCH occupying a plurality of continuous CCEs, the terminal uses an A/N resource corresponding to the CCE having the smallest index of a plurality of PUCCH constituent resources corresponding to a plurality of CCEs (that is, the A/N resource that has been associated with the CCE having a CCE index that is even number) to transmit the A/N signal to the base station. Specifically, the A/N resource number $n_{PUCCH}$ is established by the following equation (NPL 3).

[1]
$$n_{PUCCH} = N + n_{CCE} \quad \text{(Equation 1)}$$

In this case, the above-noted A/N resource number $n_{PUCCH}$ is the above-described A/N resource number. N represents the A/N resource offset value given in common within the cell, and $n_{CCE}$ represents the number of the CCE having the smallest index onto which the PDCCH is mapped. According to Equation 1, it can be seen that an A/N resource within a certain range can be used in accordance with the range that can be taken by $n_{CEE}$. In the following, the A/N resource that is determined depending upon the control information scheduling of PDCCH in this manner will be noted as D-A/N (dynamic A/N (dynamic ACK/NACK)).

As described above, the A/N resources include frequency resources in addition to code resources. Since PUCCH and PUSCH use the same frequency band in the uplink, there is a tradeoff between the region of PUCCH that includes the D-A/N and the bandwidth of PUSCH.

CITATION LIST

Non-Patent Literature

NPL 1
3GPP TS 36.211 V10.4.0, "Physical Channels and Modulation (Release 10)," December 2011
NPL 2
3GPP TS 36.212 V10.4.0, "Multiplexing and channel coding (Release 10)," December 2011
NPL 3
3GPP TS 36.213 V10.4.0, "Physical layer procedures (Release 10)," December 2011

SUMMARY OF INVENTION

Technical Problem

In Rel. 11, studies are being carried out on introducing a new control channel E-PDCCH (Enhanced-PDCCH) which is different from PDCCH. Since PDCCH is operated according to cell-specific parameters, there is a problem that PDCCH is not suitable for CoMP (Coordinated multipoint operation) in which coordinated communication is performed among a plurality of different cells or HetNet (Heterogeneous network) in which a pico base station is arranged and operated within a cell of a macro base station. E-PDCCH is individually set for each terminal and is transmitted using specific one or a plurality of PRBs (Physical Resource Blocks) specified in advance (hereinafter, this specific one or a plurality of PRBs will be described as "E-PDCCH set"). One or a plurality of E-PDCCH sets are set for each terminal. FIG. 4 shows an example where two E-PDCCH sets are set: E-PDCCH set (1) made up of four PRBs and E-PDCCH set (2) made up of two PRBs. When downlink data is allocated, a control signal is transmitted and received through conventional PDCCH or one of the E-PDCCH sets.

Just like PDCCH, E-PDCCH is made up of one or a plurality of enhanced control channel elements (eCCE). A base station transmits control information using as many eCCEs as is necessary to indicate control information to the terminal to be allocated. Note that the control information is scheduled by being closed within an E-PDCCH set. That is, even when a plurality of E-PDCCH sets are set, control information of each terminal is transmitted using eCCEs that are consecutive within the E-PDCCH sets. Therefore, the indexes of eCCE numbers are independent among different E-PDCCH sets.

Furthermore, in E-PDCCH, a distributed mode (FIG. 5A) or localized mode (FIG. 5B) is set for each E-PDCCH set. In the distributed mode, each eCCE is further subdivided into smaller element blocks and transmitted by being distributed to one or a plurality of PRBs making up the E-PDCCH set. This allows a higher frequency diversity effect to be obtained. In the localized mode, each eCCE is arranged by being closed within a single PRB making up the E-PDCCH set (that is, not distributed). Therefore, in the localized mode, it is possible to obtain a high frequency scheduling effect by appropriately performing frequency scheduling corresponding to feedback from the terminal or the like.

It is defined that a starting resource of A/N resource numbers can be set from a higher layer independently of each E-PDCCH set to determine resources of an A/N signal for PDSCH allocated by E-PDCCH. It is also defined that the A/N resource numbers corresponding to E-PDCCH are determined using an A/N resource offset value specific to the above-described E-PDCCH set and an eCCE number having the smallest index among eCCE numbers to which E-PDCCH is mapped. As the simplest example, A/N resource allocation based on, for example, equation 2 below is being studied.

[2]

$$n_{PUCCH\text{-}E\text{-}PDCCH(n)} = N_{E\text{-}PDCCH(n)} + n_{eCCE(n)} \quad \text{(Equation 2)}$$

Here, $n_{PUCCH\text{-}E\text{-}PDCCH(n)}$ is an A/N resource number, $N_{E\text{-}PDCCH(n)}$ is an A/N resource offset corresponding to n-th E-PDCCH set(n) indicated from a higher layer and $n_{eCCE(n)}$ is the eCCE number for the eCCE with which E-PDCCH has actually been transmitted and which has the smallest index among eCCE numbers defined in E-PDCCH set(n).

By appropriately setting an A/N resource offset corresponding to E-PDCCH set(n), it is possible to appropriately allocate an A/N signal to be transmitted by a terminal even in an environment in which PDCCH and one or a plurality of E-PDCCH sets are operated. FIG. 6 shows an example of A/N resource control when PDCCH and two E-PDCCH sets (1) and (2) are operated. Since resource regions that can be taken by respective dynamic A/Ns are defined by the A/N resource offset and the number of eCCEs included in the E-PDCCH set (the number of CCEs in the case of PDCCH), if the value of the A/N resource offset is adjusted so that those values do not overlap with each other, it is possible to simultaneously operate PDCCH and E-PDCCH sets (1) and (2).

However, if the A/N resource offset is set to a sufficiently large value, the total amount of resources required for D-A/N increases according to the number of E-PDCCH sets to be used and there is a problem that the PUCCH overhead increases. This results in a decrease in bands assignable to PUSCH, causing uplink throughput to deteriorate.

Conversely, as shown in FIG. 7, the system may be operated such that the A/N resource offset is set to a small value and a plurality of dynamic A/N regions overlap with each other. In this case, it is possible to reduce the necessary PUCCH resource region, thereby increasing resources allocatable to PUSCH, and an improvement of uplink throughput can be expected. However, A/N resources may collide (overlap) between different E-PDCCH sets or PDCCH/E-PDCCHs. Since an A/N resource can be allocated to only one of PDCCH/E-PDCCHs, allocation may be blocked and the downlink throughput may deteriorate.

Scheduling of PDCCH/E-PDCCH by the base station is important to prevent collision of A/N resources while causing a plurality of dynamic A/N regions to overlap with each other. For example, as shown in FIG. 7 even when the dynamic A/N regions overlap with each other, PDCCH/E-PDCCHs may be scheduled so that A/N resources may intensively use the left side (region where A/N resource numbers are small) within the dynamic A/N region and it is thereby possible to prevent collision in overlapping dynamic A/N regions. That is, by scheduling PDCCH/E-PDCCHs so as to intensively use CCE/eCCEs having small indexes, it is possible to enable overlapping of dynamic A/N regions and reduce the total amount of PUCCH resources.

Meanwhile, the aforementioned method will produce constraints on scheduling of PDCCH/E-PDCCH. That is, since consecutive numbers of CCE/eCCEs correspond to consecutive numbers of A/N resources, PDCCH/E-PDCCH of each terminal can only be scheduled using CCE/eCCE having a small index as a leading index. In the case of PDCCH, CCEs are spread over a plurality of different frequencies. Consecutive different CCEs are arranged at a plurality of different frequencies. Therefore, even when PDCCHs of many terminals are intensively scheduled onto CCEs having small indexes, control information is spread in the frequency direction. Therefore, even when PDCCHs are intensively scheduled onto CCEs having small indexes, it is possible to secure a frequency diversity effect.

In the case of E-PDCCH, in the distributed mode, eCCEs are spread over a plurality of different PRBs as in the case of PDCCH, and therefore even when PDCCHs are intensively scheduled onto CCEs having small indexes, it is possible to secure a frequency diversity effect as in the case of PDCCH. However, in the localized mode, each eCCE is transmitted only by a specific PRB. Therefore, limiting A/N resource indexes to be used to within a certain range results in constraints on PRBs onto which E-PDCCH can be scheduled.

An object of the present invention is to provide a radio communication terminal, a base station apparatus and a resource allocation method capable of flexible frequency scheduling of E-PDCCH while preventing collision of A/Ns in E-PDCCH in a localized mode (scheme).

Solution to Problem

A radio communication terminal according to an aspect of the present invention includes: a receiving section that receives a control signal via an enhanced physical downlink control channel; a control section that determines an ACK/NACK resource for transmitting an ACK/NACK signal based on an association rule according to which, in the enhanced physical downlink control channel for transmitting each enhanced control channel element in a single frequency resource block, optional consecutive numbers of ACK/NACK resources are associated with the enhanced control channel elements included in different frequency resource blocks; and a transmitting section that transmits the ACK/NACK signal using the determined ACK/NACK resource.

A base station apparatus according to another aspect of the present invention includes: a receiving section that receives an ACK/NACK signal transmitted by a radio communication terminal; a control section that determines, when transmitting each enhanced control channel element for a control signal to the radio communication terminal using a single frequency resource block, an ACK/NACK resource based on an association rule according to which optional consecutive numbers of ACK/NACK resources are associated with an enhanced physical downlink control channel included in different frequency resource blocks, and that schedules a control signal onto the enhanced physical downlink control channel; and a transmitting section that transmits the control signal.

A resource allocation method according to still another aspect of the present invention includes: assigning numbers so that, in an enhanced physical downlink control channel for transmitting each enhanced control channel element making up a control signal in a single frequency resource block, consecutive numbers of the enhanced control channel elements are included in an identical or a nearest settable frequency resource block; and making a determination based on an association rule according to which optional consecutive numbers of ACK/NACK resources are associated with the enhanced control channel elements included in different frequency resource blocks.

Advantageous Effects of Invention

According to the present invention, it is possible to flexibly perform frequency scheduling of an enhanced physical downlink control channel while reducing the overhead of ACK/NACK resources.

DESCRIPTION OF EMBODIMENTS

Figure 1:
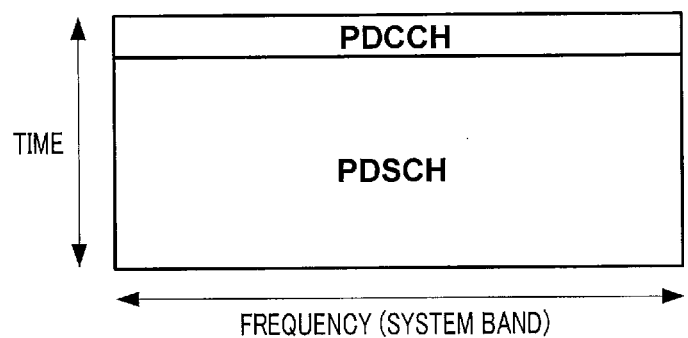
FIG. 1 is a drawing showing the subframe configuration of the downlink.
Figure 2:
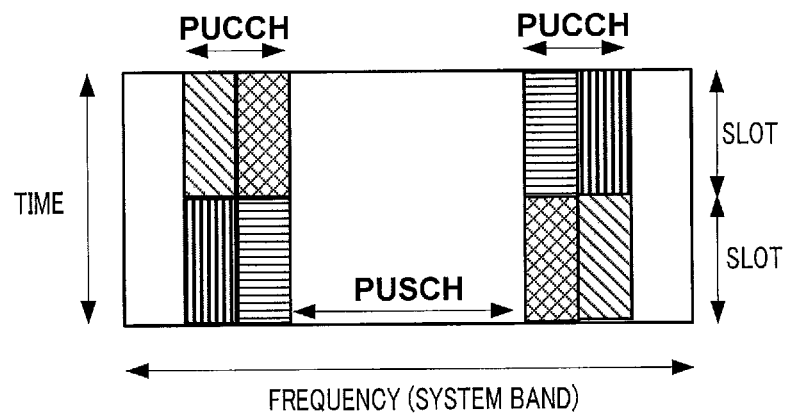
FIG. 2 is a drawing showing the subframe configuration of the uplink.
Figure 3:
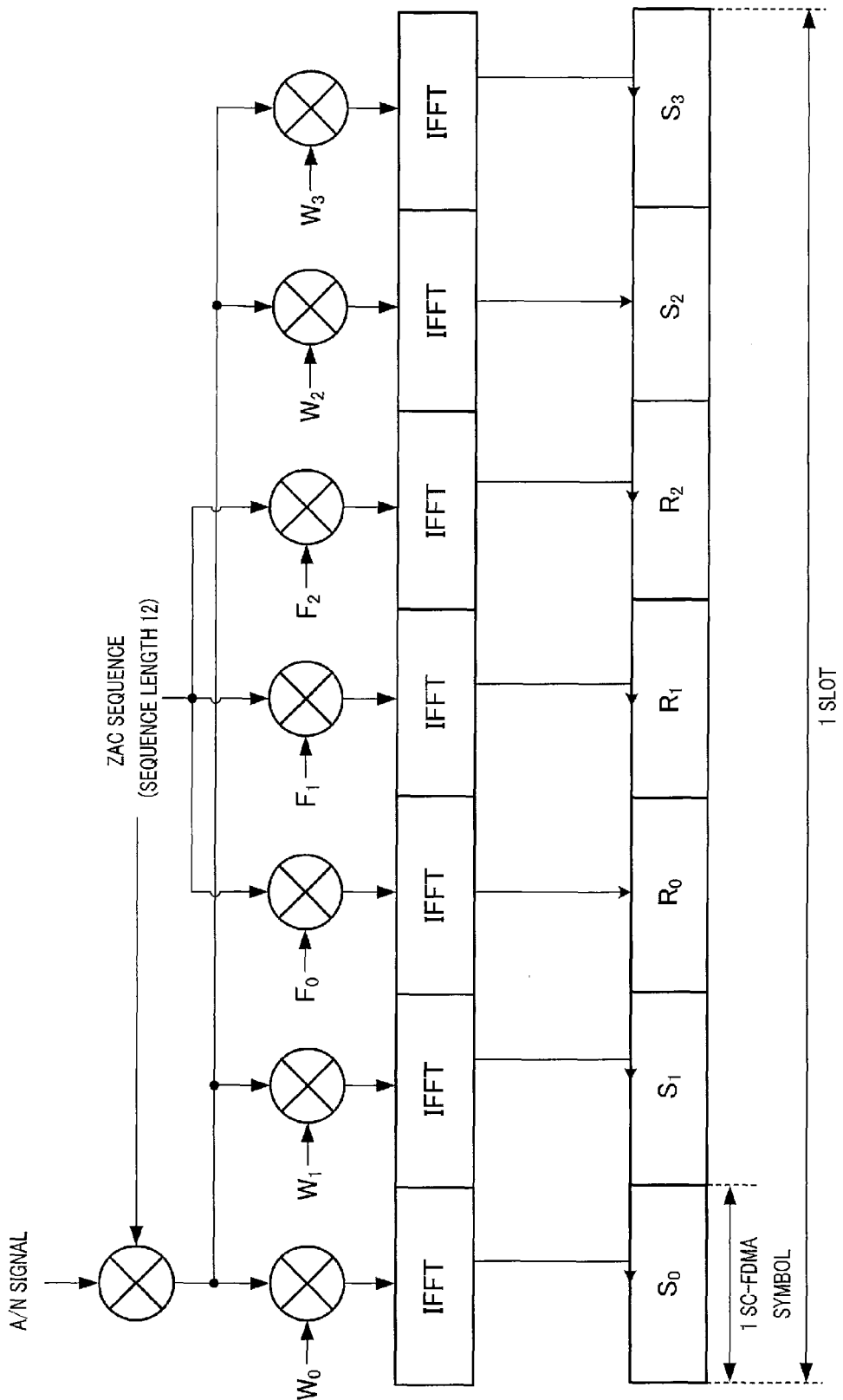
FIG. 3 is a drawing describing the method of spreading of the A/N signal in the PUCCH format 1a/1b.
Figure 4:
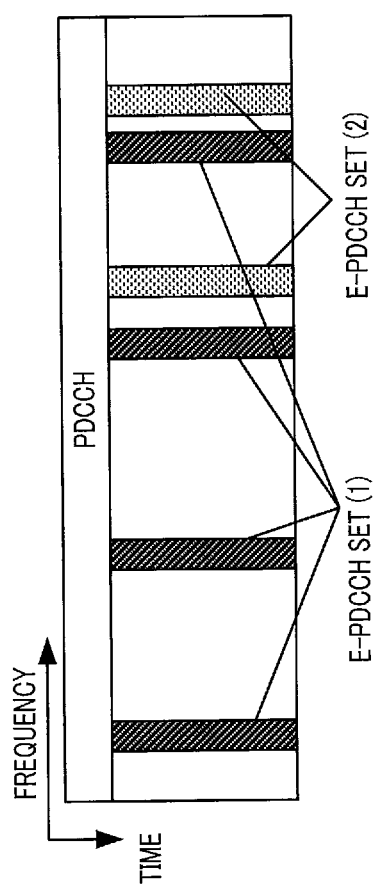
FIG. 4 is a drawing showing an example of the subframe configuration of the downlink at the time of E-PDCCH transmission.
Figure 5A:
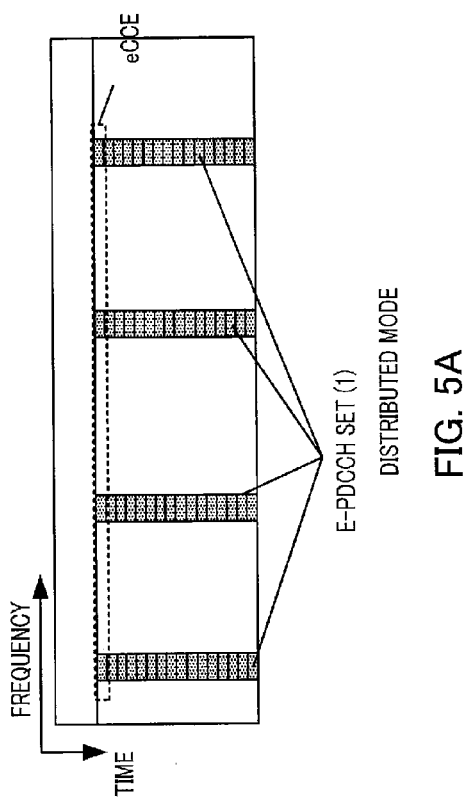
FIGS. 5A and 5B are drawings each showing an example of the subframe configuration when E-PDCCH in a distributed mode or localized mode is set.
Figure 5B:
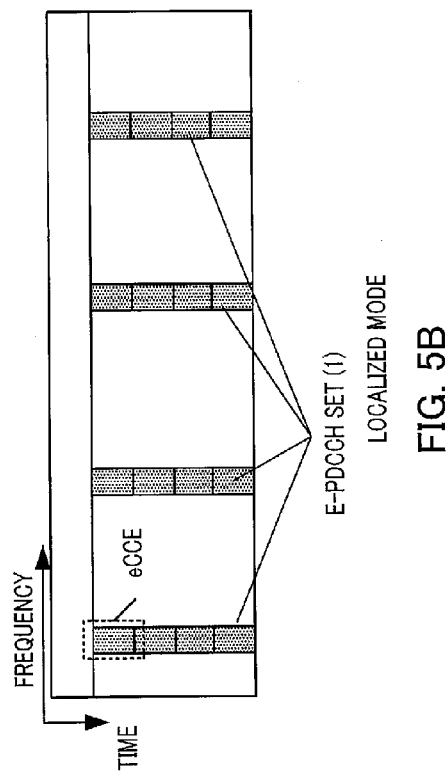
Figure 6:
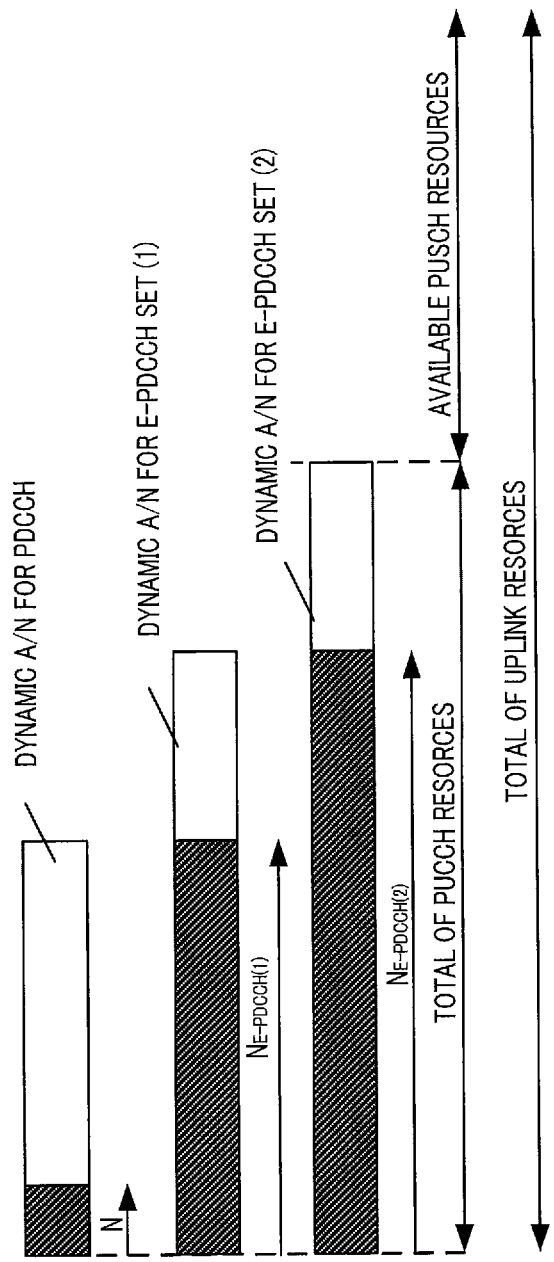
FIG. 6 is a drawing showing an example in which a D-A/N region for PDCCH and D-A/N regions for two E-PDCCH sets are set so as not to overlap with each other.
Figure 7:
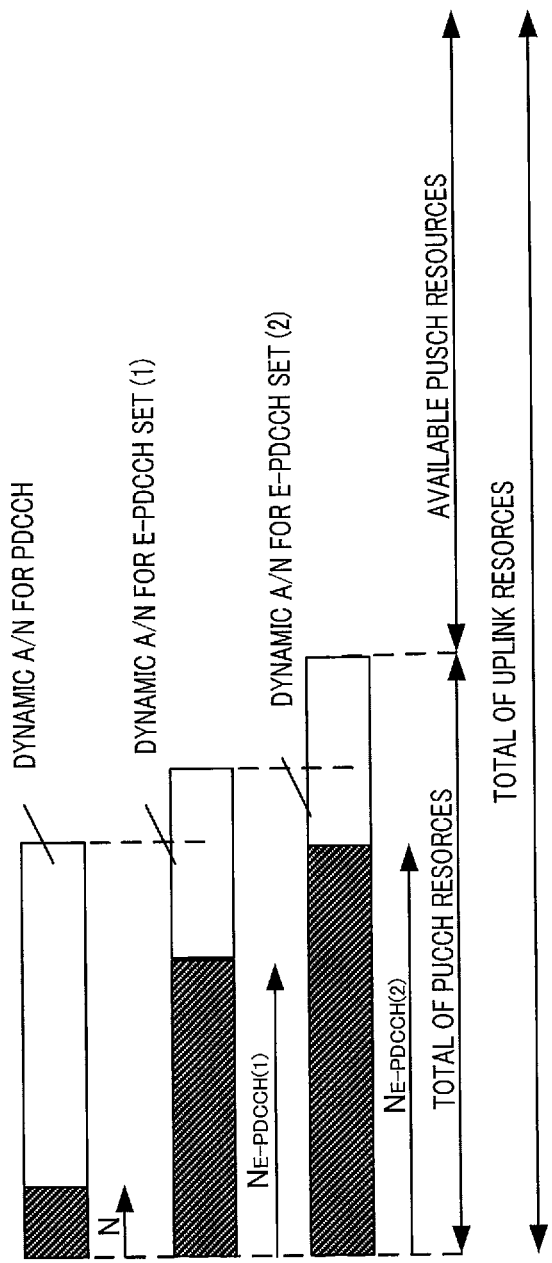
FIG. 7 is a drawing showing an example in which a D-A/N region for PDCCH and D-A/N regions for two E-PDCCH sets are set so as to overlap with each other.

Embodiments of the present invention will be described in detail below, with references made to the drawings. Note that the same components in the embodiments are assigned the same reference numerals and overlapping description thereof will be omitted.

Embodiment 1

Overview of Communication System

Figure 8:
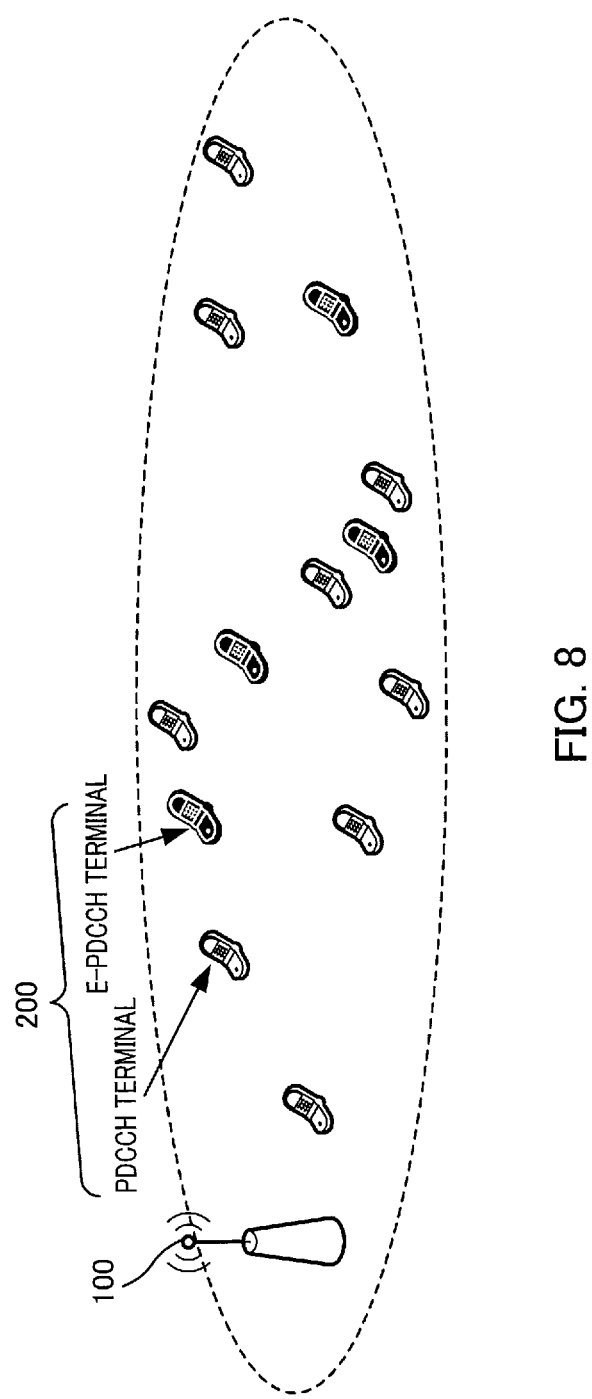
FIG. 8 is a drawing showing a communication system according to Embodiment 1.

FIG. 8 is a drawing showing a communication system according to the present embodiment. The communication system shown in FIG. 8 includes one base station 100 and a plurality of terminals 200 within a cell. In FIG. 8, only one base station 100 is installed within the cell, but the system can also be operated in a HetNet (Heterogeneous network) or CoMP (Coordinated multipoint) in which pico base stations or RRHs (Remote radio heads) connected through large capacity backhaul such as an optical fiber are distributedly arranged within the same cell.

[Configuration of Base Station 100]

Figure 9:
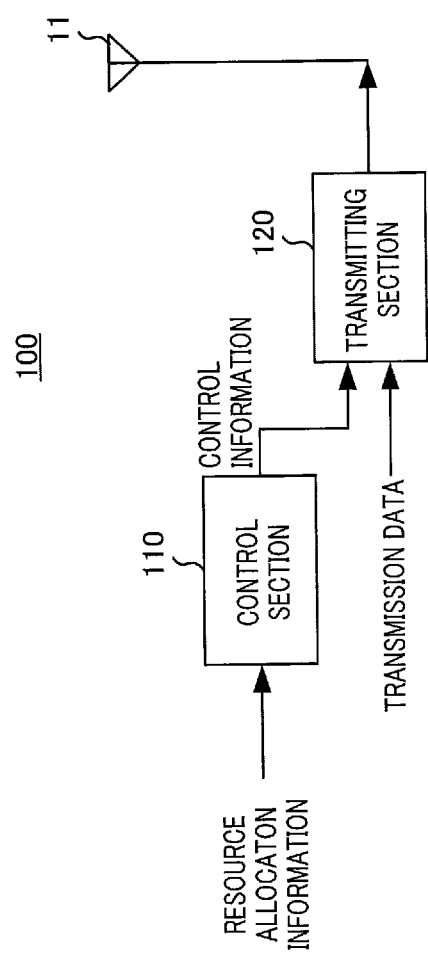
FIG. 9 is a drawing showing a main part of a base station according to Embodiment 1.

FIG. 9 is a block diagram showing a main part of base station 100.

Base station 100, as shown in FIG. 9, has control section 110 that generates a plurality of pieces of control information to be transmitted to a plurality of terminals 200, respectively, and transmitting section 120 that converts control information and transmission data to a radio transmission signal and transmits the signal by radio via antenna 11.

Control section 110 generates control information for each terminal 200 from downlink resource allocation information or the like. Control section 110 schedules the control information to be transmitted to each terminal 200 onto PDCCH or E-PDCCH. At this time, E-PDCCH is transmitted by one of E-PDCCH sets among one or a plurality of E-PDCCH sets set beforehand in terminal 200. In each of the E-PDCCH sets, E-PDCCH is transmitted in one of the distributed mode and localized mode.

Transmitting section 120 transmits, by radio, the signals through the channels, which include transmission data and control data. That is, transmitting section 120 transmits, respectively, transmission data by the PDSCH, PDCCH terminal control information by the PDCCH, and E-PDCCH terminal control information by the E-PDCCH.

Figure 10:
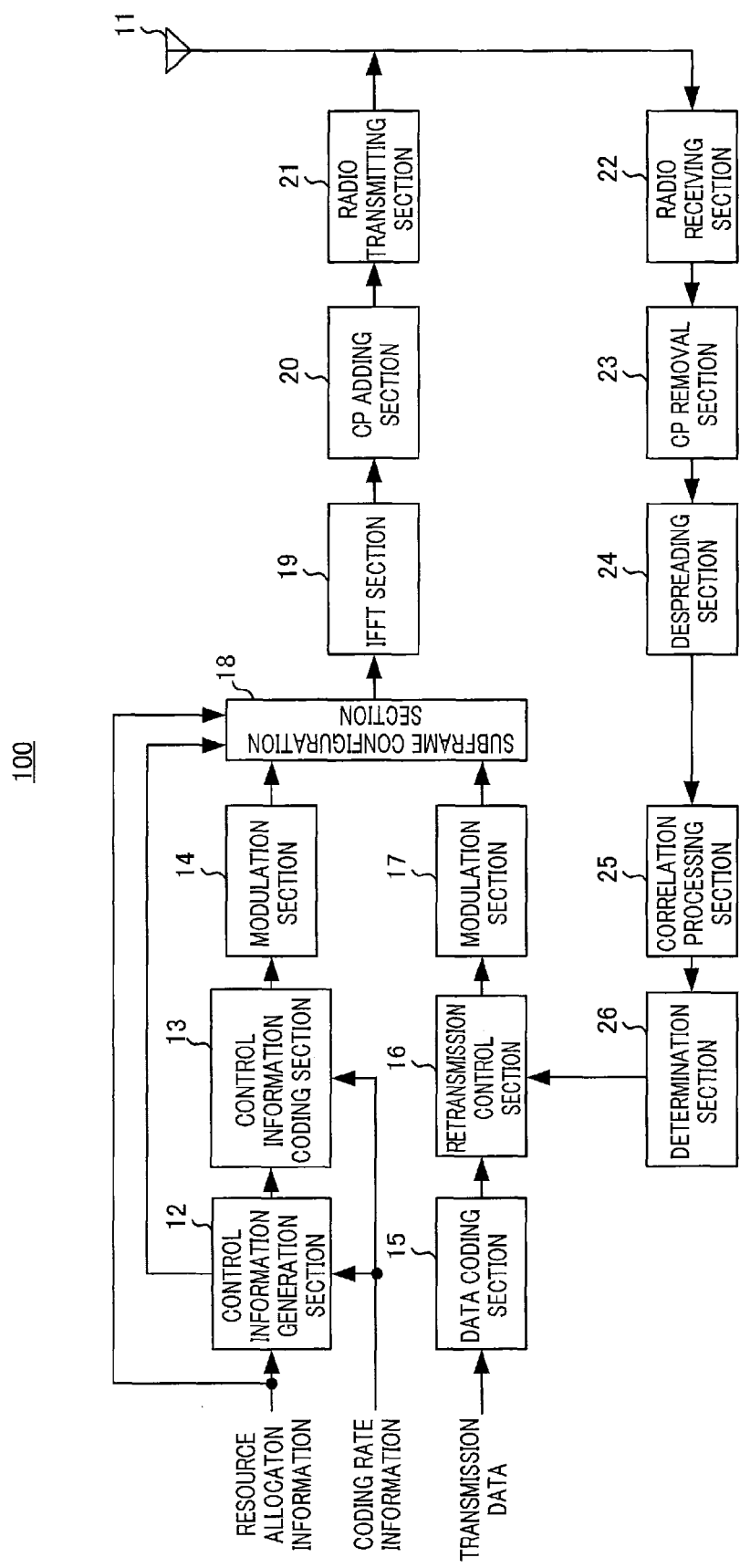
FIG. 10 is a block diagram illustrating details of the base station according to Embodiment 1.

FIG. 10 is a block diagram showing the details of base station 100.

In detail, base station 100, as shown in FIG. 10, includes antenna 11, control information generation section 12, control information coding section 13, modulation sections 14 and 17, data coding section 15, retransmission control section 16, subframe configuration section 18, IFFT section 19, CP adding section 20, radio transmitting section 21, and the like. Base station 100 also includes radio receiving section 22, CP removal section 23, despreading section 24, correlation processing section 25, determination section 26, and the like.

Of these constituent elements, control information generation section 12 functions mainly as control section 110 (FIG. 9), and the constituent elements from control information coding section 13 to radio transmitting section 21 and data coding section 15 to radio transmitting section 21 function mainly as transmitting section 120 (FIG. 9).

Base station 100 transmits PDCCH, E-PDCCH, and PDSCH on the downlink and base station 100 also receives PUCCH carrying the A/N signal on the uplink. In this case, to avoid having the description become complex, the constituent elements related to the downlink transmission of PDCCH, E-PDCCH, and PDSCH, which are closely connected with the features of the present embodiment, and the uplink reception of PUCCH with respect to that downlink data are mainly shown. The constituent elements related to uplink data reception are omitted in the illustration and descriptions.

The downlink control signal (e.g., resource allocation information) and data signal (transmission data) generated by base station 100 are each separately encoded, modulated, and input to subframe configuration section 18.

First, the generation of the control signal will be described. Control information generation section 12 generates the control information for each terminal 200, from the resource allocation results (resource allocation information) and the coding rate information of each terminal 200 for which downlink allocation is to be done. The control information for each terminal 200 includes terminal ID information indicating for which terminal 200 the control information is intended. For example, the CRC bit masked by the ID number of terminal 200 that is the control information notification destination is included in control information as the terminal ID information. In this case, different information is included in the control information mapped onto PDCCH and the control information mapped onto E-PDCCH. The generated control information for each terminal 200 is input to control information coding section 13.

Control information coding section 13 independently encodes the control information for each terminal 200 based on coding rate information. The encoding may be done with the control information mapped onto PDCCH and the control information mapped onto E-PDCCH being either same or different. The output of control information coding section 13 is input to modulation section 14.

Modulation section 14 independently modulates the control information of each terminal 200. The modulation may be done with the control information mapped onto PDCCH and the control information mapped onto E-PDCCH being either same or different. The output of modulation section 14 is input to subframe configuration section 18.

Next, the generation of the data signal will be described. Data coding section 15 adds a CRC bit that is masked based on the ID of each terminal 200 to the data bit stream (transmission data) transmitted to each terminal 200 and performs error correction coding. The output of data coding section 15 is input to retransmission control section 16.

Retransmission control section 16 holds the coded transmission data for each terminal 200 and outputs the transmission data to modulation section 17 at the time of the first transmission. With respect to terminal 200 to which the NACK signal has been input from determination section 26, that is, terminal 200 that will perform retransmission, retransmission control section 16 outputs the transmitted data for retransmission to modulation section 17.

Modulation section 17 performs data modulation of each of the data coded sequences for each terminal 200. The modulated streams are input to subframe configuration section 18.

Subframe configuration section 18 maps the input control information sequences and data sequences onto resources divided by the time and frequency of a subframe based on resource allocation information. By doing this, subframe configuration section 18 configures and outputs subframes to IFFT section 19.

IFFT section 19 performs an IFFT (inverse fast Fourier transform) on the transmission subframes that are input thereto, thereby obtaining a time waveform, which is input to CP adding section 20.

CP adding section 20 adds a CP to each OFDM symbol within the subframe and outputs the result to radio transmitting section 21.

Radio transmitting section 21 performs radio modulation of the input symbols to the carrier frequency band and transmits the modulated downlink signal via antenna 11.

Radio receiving section 22 receives, as input, an A/N signal of terminal 200 from antenna 11 and performs radio demodulation on the input signal. The demodulated downlink signal is input to CP removal section 23.

CP removal section 23 removes the CP from each SC-FDMA (single carrier-frequency-division multiple access) symbol within the downlink signal. After removal of the CPs, the symbols are input to despreading section 24.

In order to extract the A/N of the target terminal 200 from the A/N signals of a plurality of terminals 200 that have been code multiplexed, despreading section 24 performs despreading by a corresponding orthogonal code. The despread signal is input to correlation processing section 25.

Correlation processing section 25 performs correlation processing by a ZAC sequence in order to extract the A/N. The signal after correlation processing is input to determination section 26.

Determination section 26 determines whether the A/N of terminal 200 is ACK or NACK. If the determination result indicates ACK, determination section 26 prompts retransmission control section 16 to transmit the next data. If, however, the determination result indicates NACK, determination section 26 prompts retransmission control section 16 to perform retransmission.

[Configuration of Terminal 200]

Figure 11:
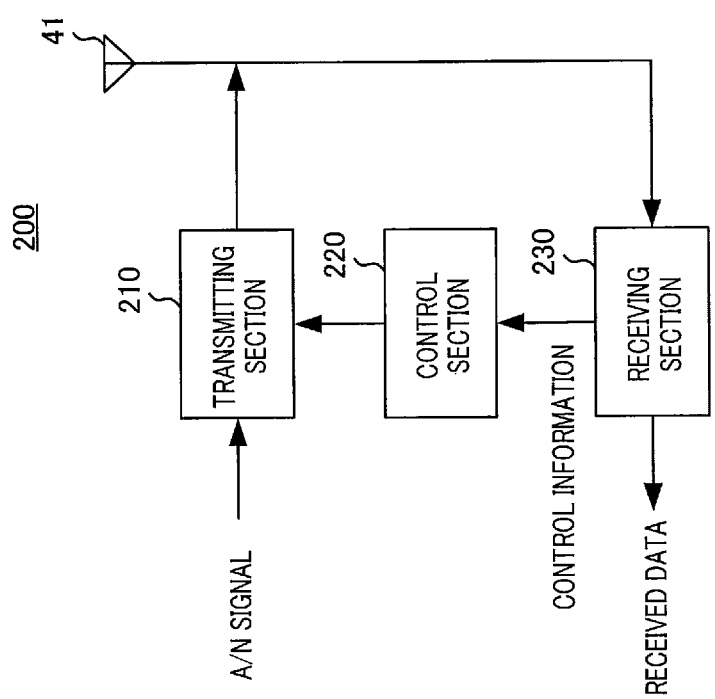
FIG. 11 is a block diagram illustrating main parts of a terminal according to Embodiment 1.

FIG. 11 is a block diagram showing a main part of a terminal.

Terminal 200 includes receiving section 230 that receives control information and downlink data via antenna 41, control section 220 that determines the resource used for transmitting the A/N signal, based on the control information, and transmitting section 210 that transmits the A/N signal using the determined resource.

If terminal 200 is set to receive E-PDCCH control information, terminal 200 becomes an E-PDCCH terminal, and if terminal 200 is set to receive PDCCH control information, terminal 200 becomes a PDCCH terminal. Terminal 200 may also be set to receive both E-PDCCH control information and PDCCH control information. That is, terminal 200 set to receive both E-PDCCH control information and PDCCH control information attempts to receive control information from both E-PDCCH and PDCCH, and becomes an E-PDCCH terminal upon successfully extracting control information of terminal 200 itself from E-PDCCH and becomes a PDCCH terminal upon successfully extracting control information of terminal 200 itself from PDCCH. Terminal 200 becomes a PDCCH terminal unless otherwise indicated or specified.

Setting information of the E-PDCCH set which may include control information of terminal 200 itself is indicated to terminal 200 by a higher layer such as RRC. The setting information of the E-PDCCH set includes information on whether the E-PDCCH set is in the localized mode or the distributed mode or the number of constituent PRBs, frequency position and A/N resource offset to determine an A/N resource when control information is transmitted using the E-PDCCH set. The number of E-PDCCH sets to be set may be one or plural. When a plurality of E-PDCCH sets are set, terminal 200 performs blind decoding on control information of terminal 200 itself using each of the E-PDCCH sets. Base station 100 transmits control information to terminal 200 using one of the E-PDCCH sets.

Receiving section 230 receives received data via the PDSCH, and control information via the E-PDCCH or PDCCH. That is, in the case of E-PDCCH terminal 200, receiving section 230 receives control information via E-PDCCH, and in the case of PDCCH terminal, receives control information via PDCCH. Receiving section 230 outputs the received control information to control section 220.

In the case of E-PDCCH terminal 200, control section 220 identifies the transmission resource for the A/N signal of the received data based on setting information of the E-PDCCH set including the received E-PDCCH and eCCE number having the smallest index for which E-PDCCH has been scheduled or the like, as the A/N resource for which the A/N signal is fed back. In the case of PDCCH terminal 200, control section 220 determines the A/N signal transmission resource in the same manner as a conventional PDCCH terminal. Control section 220 outputs the details of the determination to transmitting section 210.

Transmitting section 210 uses the determined resource to transmit the A/N signal of the received data by radio.

Figure 12:
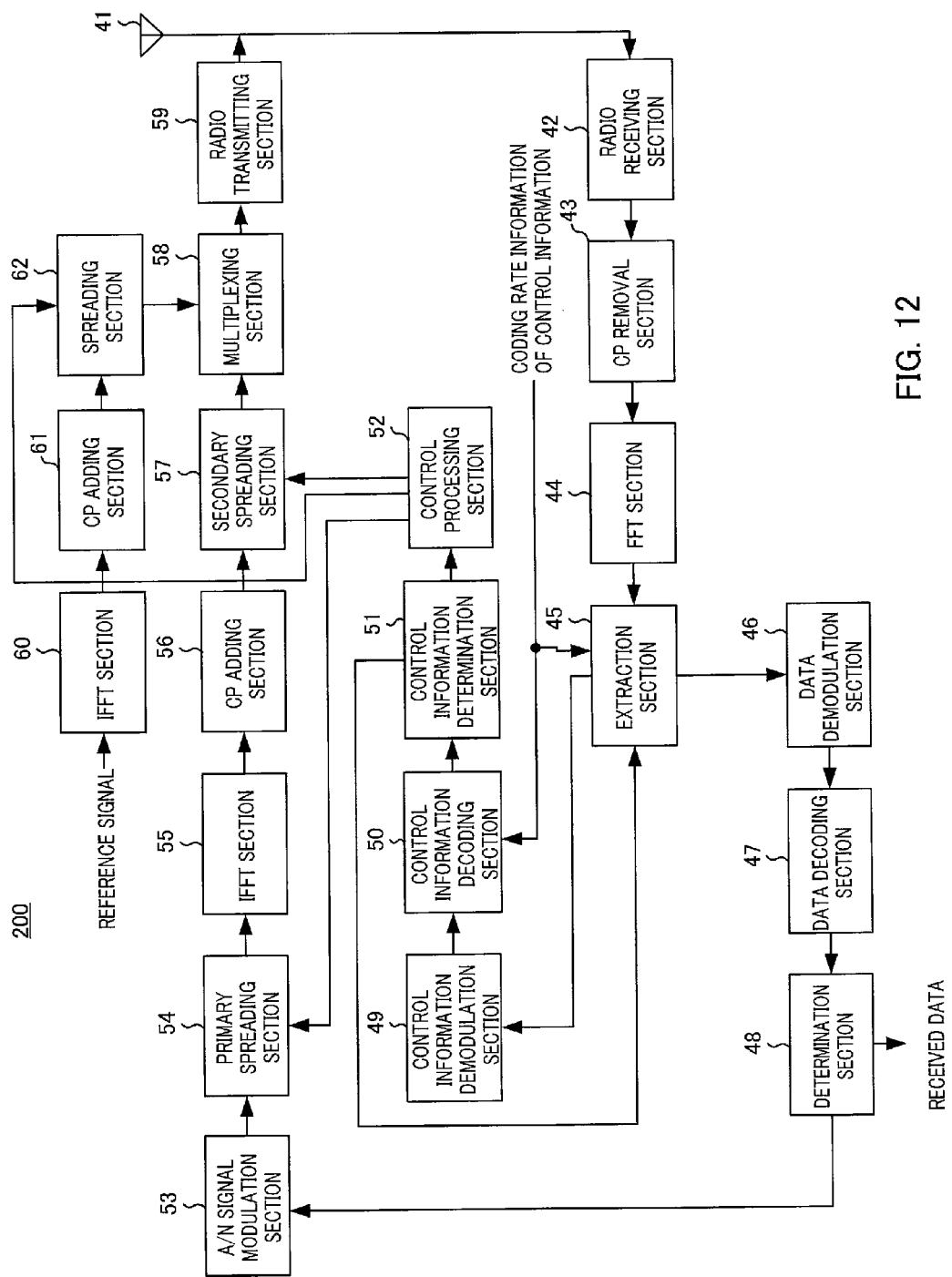
FIG. 12 is a block diagram illustrating details of the terminal according to Embodiment 1.

FIG. 12 is a block diagram showing the details of terminal 200.

As shown in FIG. 12, specifically, terminal 200 includes antenna 41, radio receiving section 42, CP removal section 43, FFT section 44, extraction section 45, data demodulation section 46, data decoding section 47, determination section 48, control information demodulation section 49, control information decoding section 50, control information determination section 51, control processing section 52, A/N signal modulation section 53, primary spreading section 54, IFFT section 55, CP adding section 56, secondary spreading section 57, multiplexing section 58, and radio transmitting section 59. Terminal 200 also includes IFFT section 60, CP adding section 61, and spreading section 62.

Of the above constituent elements, control processing section 52 mainly functions as control section 220 (FIG. 11). Constituent elements from A/N signal modulation section 53 to radio transmitting section 59 mainly function as transmitting section 210 (FIG. 11), and constituent elements from radio receiving section 42 to determination section 48 and from radio receiving section 42 to control information determination section 51 mainly function as receiving section 230 (FIG. 11).

Terminal 200 receives, on the downlink, control information mapped onto PDCCH or E-PDCCH, and downlink data mapped onto PDSCH. Terminal 200 transmits PUCCH on the uplink. In this case, to avoid having the description become complex, only the constituent elements related to downlink reception (specifically, PDCCH, E-PDCCH, and PDSCH), which are closely connected with the features of the present embodiment, and related to the uplink transmission (specifically, PUCCH) with respect to the downlink received data are indicated.

Radio receiving section 42 inputs the input from antenna 42 that has received the downlink signal transmitted from base station 100, performs radio demodulation, and outputs the demodulated signal to CP removal section 43.

CP removal section 43 removes the CP from each OFDM symbol time waveform within the subframe and outputs the result to FFT section 44.

FFT section 44 performs an FFT (fast Fourier transform) on the received time waveform in order to perform OFDM (orthogonal frequency division multiplexing) demodulation, thereby obtaining a subframe in the frequency domain. The obtained received subframe is input to extraction section 45.

Extraction section 45 extracts the control information intended for the terminal itself from either the PDCCH region or the E-PDCCH region. Information indicating in which one of PDCCH and E-PDCCH the control information is included is instructed beforehand from base station 100 (not shown). The number of such instructions may be one or plural. Extraction section 45 extracts one or a plurality of control information candidates from a control information region onto which the control information of the terminal itself is possibly mapped, and outputs the candidate to control information demodulation section 49. When a result is obtained from control information determination section 51, extraction section 45 extracts a data signal intended for the terminal from the received subframe based on the resource allocation result included in the control information intended for the terminal. The obtained data signal is input to data demodulation section 46.

Control information demodulation section 49 demodulates one or more pieces of input control information and outputs the result to control information decoding section 50.

Control information decoding section 50 decodes the one or more input demodulated sequences using coding rate information of the control information. The decoding result is input to control information determination section 51.

Control information determination section 51 determines, from the one or more decoding results, the control information intended for the terminal, using the terminal ID information. The determination uses, for example, the CRC bit that is masked by the ID information of the terminal itself included in the control information. If there is control information intended for the terminal itself, control information determination section 51 outputs that control information to extraction section 45. Control information determination section 51 outputs the control information to control processing section 52.

Control processing section 52 operates differently between the case of PDCCH terminal 200 and the case of E-PDCCH terminal 200.

In the case of PDCCH terminal 200, control processing section 52 obtains the resource number of the A/N signal based on Equation 1 from the number of the resource (CCE) onto which the control information is mapped. From the obtained A/N signal resource number, control processing section 52 determines the spreading codes used for primary spreading, secondary spreading, and the reference signal, and the frequency resource block (RB) transmitting PUCCH. This information is input to primary spreading section 54, secondary spreading section 57, and to spreading section 62 of the reference signal.

Meanwhile, in the case of E-PDCCH terminal 200, control processing section 52 determines the A/N resource number based on the setting information notified beforehand about the E-PDCCH set including the received E-PDCCH and the value of eCCE having the smallest index among eCCEs for which E-PDCCH is scheduled or the like. Control processing section 52 determines each spreading code used for primary spreading, secondary spreading and a reference signal corresponding to the specified A/N resource number, and a frequency resource block (RB) for transmitting PUCCH. Control processing section 52 outputs each spreading code to primary spreading section 54, secondary spreading section 57, and the reference signal spreading section 62.

Data demodulation section 46 demodulates the input data signal intended for the terminal itself. The result of the demodulation is input to data decoding section 47.

Data decoding section 47 decodes the input demodulated data. The result of the decoding is input to determination section 48.

Determination section 48 uses the CRC masked by the ID of terminal 200 to determine whether or not the decoding result is correct. If the decoding result is correct, determination section 48 outputs the ACK signal to A/N signal modulation section 53 and extracts the received data. If the decoding result is not correct, determination section 48 outputs the NACK signal to A/N signal modulation section 53.

A/N signal modulation section 53, depending upon whether the input signal is ACK or NACK, generates modulated symbols having different values. The generated demodulated symbol is input to primary spreading section 54.

Primary spreading section 54 uses the ZAC sequence input from control processing section 52 to perform primary spreading of the A/N signal and outputs the A/N signal after primary spreading to IFFT section 55. In this case, because the cyclic shift value used for cyclic shift hopping differs in units of SC-FDMA, primary spreading section 54 uses a different cyclic shift value for each SC-FDMA symbol to perform primary spreading of the A/N signal.

IFFT section 55 performs an IFFT of each SC-FDMA symbol input from primary spreading section 54 and outputs the obtained time waveform to CP adding section 56.

CP adding section 56 adds a CP to each input SC-FDMA time waveform and outputs this signal to secondary spreading section 57.

Secondary spreading section 57 uses a block-wise spreading code sequence to perform secondary spreading of the SC-FDMA time waveform after the adding the CP. The spreading code used is a code specified by control processing section 52. The stream that has been subjected to secondary spreading is input to multiplexing section 58.

Multiplexing section 58 time-multiplexes the two input sequences received as input from the spreading section 62 for the reference signal and secondary spreading section 57, thereby generating a PUCCH subframe. The time multiplexed signal is input to radio transmitting section 59.

Radio transmitting section 59 performs radio modulation of the input signal to the carrier frequency band and transmits the uplink signal by radio from antenna 41.

IFFT section 60 performs IFFT on the reference signal and outputs the time waveform obtained to CP adding section 61.

CP adding section 61 adds a CP to the time waveform of the input reference signal and outputs this signal to spreading section 62.

Spreading section 62 spreads the time waveform after the adding the CP. The spreading code used is a code specified by control processing section 52. The stream that has been spread is input to multiplexing section 58.

[Operation]

Figure 13:
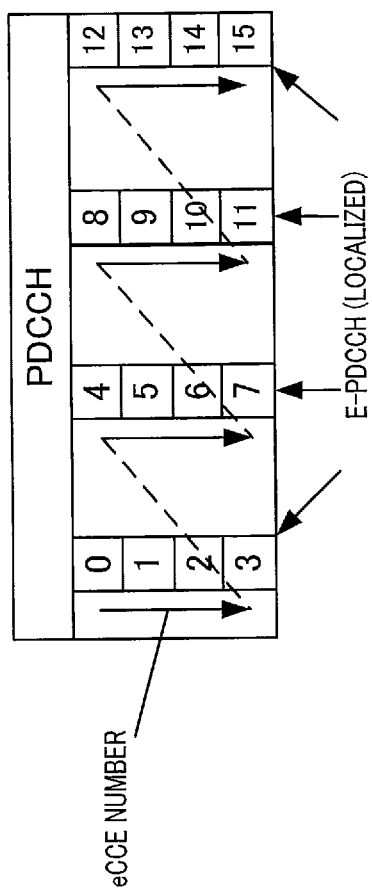
FIG. 13 is a drawing showing numbering of eCCEs according to Embodiment 1.

In an E-PDCCH set in the localized mode according to the present embodiment, eCCE numbers are assigned so as to be consecutive within a PRB. FIG. 13 illustrates an example of an E-PDCCH set in the localized mode made up of four PRBs. Suppose each PRB includes four eCCEs herein. First, eCCE numbers are consecutively given within a PRB included in the E-PDCCH set. Then, eCCE numbers are consecutively assigned to the next PRB.

When control information is transmitted in the E-PDCCH set in the localized mode, eCCE having the smallest index is associated with the A/N resource number according to a rule that satisfies the following condition.

1. That consecutive numbers of A/N resources should correspond to eCCEs of different PRBs.
2. That eCCE consecutive numbers should correspond to distant A/N resources.
3. That eCCE consecutive numbers should be included in the same or nearest PRB.

A specific example is expressed by equation 3. Here, N(n) is the number of PRBs included in an n-th E-PDCCH set(n) and M(n) is the number of eCCEs within a PRB included in the n-th E-PDCCH set(n).

[3]

$$n_{PUCCH\text{-}E\text{-}PDCCH(n)} = N_{E\text{-}PDCCH(n)} + (n_{eCCE(n)} \times N(n) + \lfloor n_{eCCE(n)}/M(n) \rfloor) \bmod(N(n)M(n))$$

(Equation 3)

Hereinafter, the processing flow of base station 100 and terminal 200 in Embodiment 1 will be described by step (1) through step (6).

Step (1): Base station 100 indicates, to terminal 200, the use of E-PDCCH, terminal 200 to which control information can be transmitted by E-PDCCH before transmission/reception of PDSCH. Base station 100 need not make particular indication to terminal 200 to which transmission is not performed using the E-PDCCH. If, in particular, there is no notification or recognition is not possible, terminal 200 receives control information while assuming that the control information is transmitted on the PDCCH. Base station 100 indicates to terminal 200 to which control information is possibly transmitted using E-PDCCH of setting information of the E-PDCCH set which is possibly used before transmission and/or reception of PDSCH. The setting information of the E-PDCCH set includes information as to whether the E-PDCCH set is in a localized mode or distributed mode, the number of constituent PRBs and frequency position or A/N resource offset to determine an A/N resource when control information is transmitted using the E-PDCCH set or the like. The number of E-PDCCH sets to be set may be one or plural.

Step (2): Base station 100 determines the terminal 200 for assignment of data in each subframe and performs scheduling within the PDSCH. The scheduling uses the CSI feedback and sounding reference signal (SRS) transmitted by terminal 200 and the like, in addition to the amount of traffic to each terminal 200.

Step (3): Base station 100 generates control information including the PDSCH scheduling result intended for each terminal 200 and schedules the control information onto PDCCH or E-PDCCH. For terminal 200 for which a plurality of E-PDCCH sets are set, base station 100 determines an E-PDCCH set for transmitting control information and schedules the control information in the E-PDCCH set.

Base station 100 confirms whether or not collision of A/N resources occurs among all terminals 200 onto which control information is scheduled. When collision of A/N resources occurs, base station 100 performs scheduling over again so as not to cause collision. Alternatively, base station 100 leaves one terminal 200 among colliding terminals 200 and abandons the scheduling of other terminals 200 (allocation block).

Step (4): When scheduling of the control information for all terminals 200 is completed, base station 100 transmits, by radio, PDCCH and E-PDCCH and PDSCH downlink data using the downlink Step (5): Terminal 200 obtains from the received signal the control information intended for terminal 200 and extracts and decodes the data signal. Particularly for terminal 200 to which control information is possibly transmitted on E-PDCCH, base station 100 performs blind detection on one or a plurality of E-PDCCH sets that can be used. Upon detecting control information, terminal 200 identifies a resource having a code and a frequency for transmitting an A/N signal corresponding to the received data signal. E-PDCCH terminal 200 in particular obtains an A/N resource index according to a predefined rule (e.g., equation 2 in the distributed mode, equation 3 in the localized mode or the like) based on setting information of the E-PDCCH set by which control information intended for terminal 200 is transmitted and an eCCE number having the smallest index for which control information is scheduled.

Step (6): Terminal 200 identifies either ACK or NACK, in accordance with the determination result of the data signal, and transmits the A/N signal using the A/N resources (code and frequency resources) identified as noted above.

[Effects]

Figure 14:
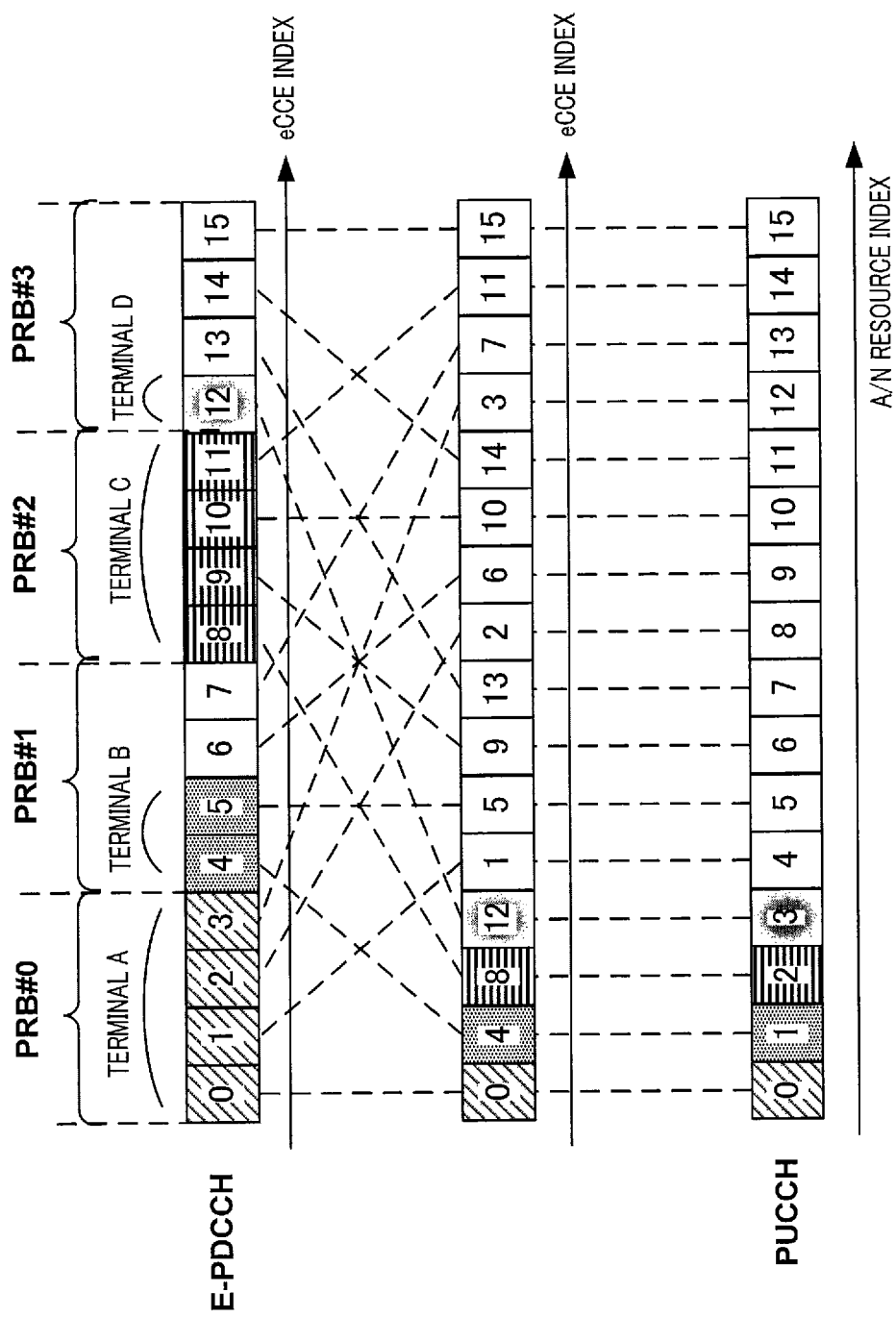
FIG. 14 is a drawing showing a relationship between eCCE indexes and A/N resource indexes according to Embodiment 1 when four terminals are allocated by E-PDCCH.

According to the conventional method as shown in equation 2, if A/N resources of a plurality of different terminals are concentrated on a small index, control information included in the E-PDCCH set is also concentrated on the eCCE of the small index. For this reason, when using E-PDCCH in the localized mode, only specific PRBs can be allocated. Meanwhile, according to base station 100 and terminal 200 of the present embodiment, it is possible to distribute eCCE indexes corresponding to consecutive A/N resource numbers in E-PDCCH in the localized mode over different PRBs. FIG. 14 illustrates an example of a case where control information on four terminals is accommodated in E-PDCCH using equation 3. As shown in FIG. 14, it is possible to distribute control information of different terminals included in the E-PDCCH set over eCCEs of different PRBs while concentrating A/N resources of a plurality of different terminals on small indexes. Therefore, high multiuser scheduling effects can be obtained.

Control information of a single terminal is transmitted using consecutive eCCEs. In the present embodiment, consecutive eCCEs are included within the same PRB or neighboring PRB. Therefore, since control information of the terminal can be arranged in a PRB having a good channel condition of the terminal, it is possible to obtain further frequency scheduling effects according to feedback information from the terminal.

Control information of a single terminal is transmitted using consecutive eCCEs. In the present embodiment, consecutive eCCEs are included within the same PRB or neighboring PRB. Therefore, since control information of the terminal can be arranged in a PRB having a good channel condition of the terminal, it is possible to obtain higher frequency scheduling effects.

(Variations)

In Embodiment 1, when control information of different terminals is spatially multiplexed in the same eCCE space, collision of A/N resources occurs between spatially multiplexed terminals. In order to prevent this, an association rule between the eCCE having the smallest index for transmitting control information and the A/N resource number may be made to vary from one terminal to another. For example, equation 4 below may be used instead of equation 3.

[4]

$$n_{PUCCH\text{-}E\text{-}PDCCH(n)} = N_{E\text{-}PDCCH(n)} + (n_{eCCE(n)} \times N(n) + \lfloor n_{eCCE(n)}/M(n) \rfloor + a) \bmod (N(n)M(n))$$ (Equation 4)

Here, suppose "a" in equation 4 is a positive integer that adds a terminal-specific cyclic shift to the above association rule and is a parameter defined, for example, as an identification ID specific to the terminal or antenna port number for transmitting a reference signal.

Figure 15:
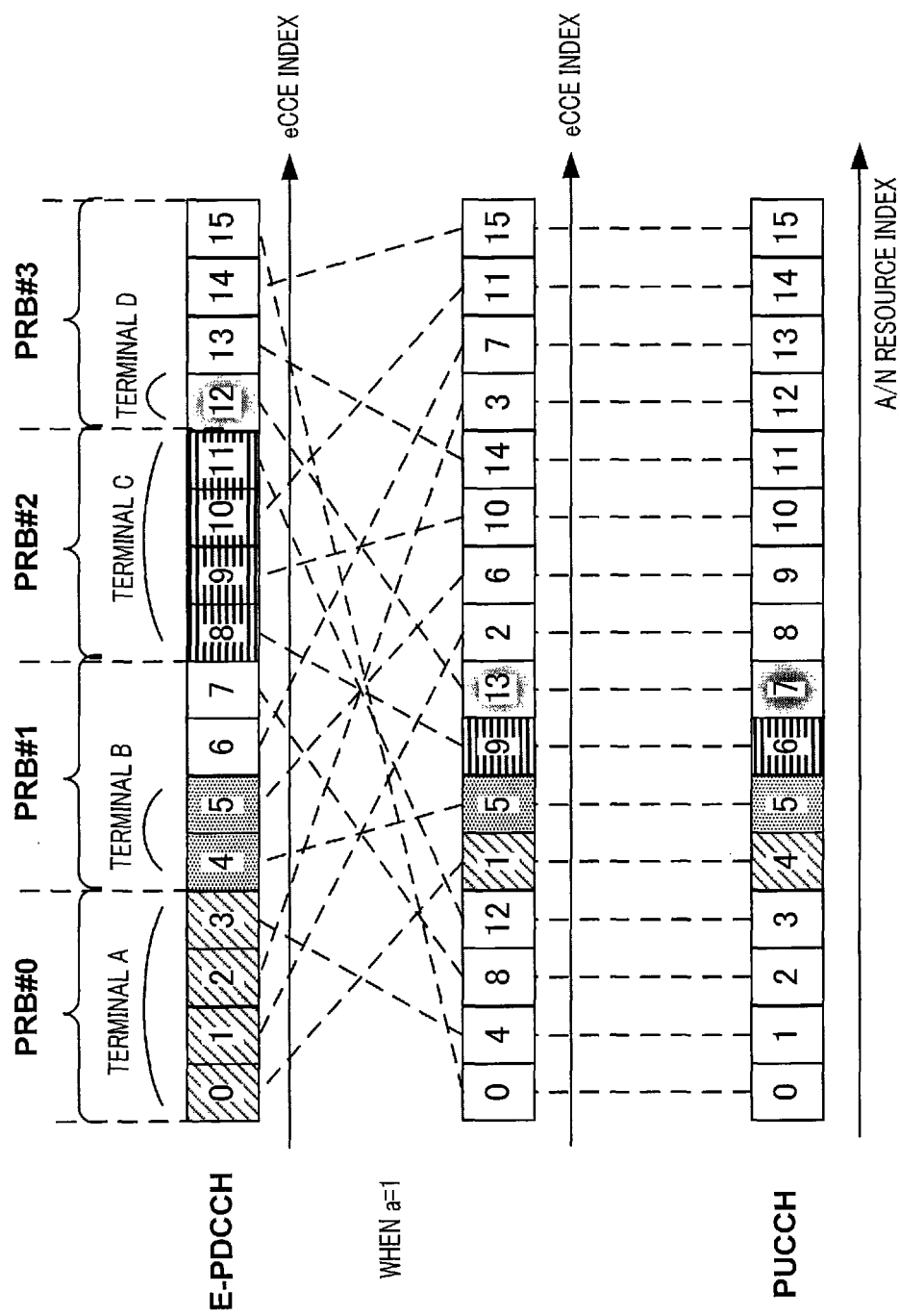
FIG. 15 is a drawing showing a relationship between eCCE indexes and A/N resource indexes according to Embodiment 1 when four terminals are allocated by E-PDCCH assuming a=1 in equation 4.

FIG. 15 illustrates an example when a=1 is assumed in equation 4 and control information of the four terminals is scheduled onto the same eCCEs as those in FIG. 14. In FIG. 15, since a=1 is assumed, although control information is transmitted using the same eCCEs as those in the case of FIG. 14, it is apparent that A/N resources are shifted by an amount corresponding to one PRB.

Therefore, when control information of terminals corresponding to a=0 and a=1 are spatially multiplexed with the same eCCE, it is possible to shift A/N resources among the multiplexed terminals to thereby avoid collision. At this time, the terminal group with a=0 and the terminal group with a=1 have neighboring A/N resource groups. That is, even when the terminal groups with a=0 and a=1 are spatially multiplexed, A/N signals can be intensively arranged on A/N resources with small numbers.

Embodiment 2

Overview of Communication System

Figure 16:
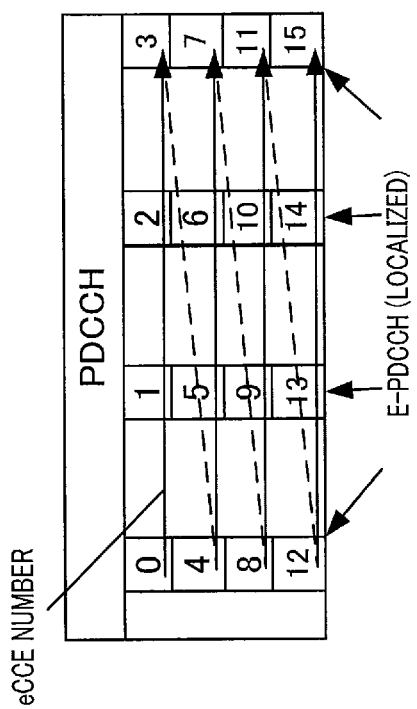
FIG. 16 is a drawing showing numbering of eCCEs according to Embodiment 2.

In Embodiment 2, eCCEs are numbered so that consecutive eCCE numbers are arranged on different PRBs. FIG. 16 illustrates an example. In Embodiment 2, an association rule is defined so that consecutive eCCE numbers correspond to consecutive A/N resources. For example, equation 2 may be used.

In the following, to avoid having the description become complex, constituent elements that are the same as in Embodiment 1 are assigned the same reference signs, and only the difference with respect to Embodiment 1 will be described.

[Configuration of Base Station]

The configuration of base station (macro base station, pico base stations) 100 differs from Embodiment 1 mainly in the difference in the processing done by control section 110, with other parts being the same as Embodiment 1.

[Configuration of Terminal]

The configuration of terminal 200 differs mainly by the difference in the processing done by control section 220, with other parts being the same as in Embodiment 1. The details of the processing done by control section 220 will be described in detail in the description of operation to follow.

[Operation]

The processing flow of base station 100 and terminal 200 in Embodiment 2 will be described by step (1) through step (6).

Step (1): Base station 100 indicates the use of E-PDCCH to terminal 200 to which control information can be transmitted on E-PDCCH before transmission and/or reception of PDSCH. Base station 100 need not particularly make an indication to terminal 200 to which control information is not transmitted on E-PDCCH. In the case of no indication or when recognition is not possible in particular, terminal 200 also receives control information assuming that control information is transmitted on PDCCH. Base station 100 indicates setting information of the E-PDCCH set which is possibly used to terminal 200 to which control information is possibly transmitted on E-PDCCH, before transmission/ reception of PDSCH. The setting information of the E-PDCCH set includes information as to whether the E-PDCCH set is in a localized mode or distributed mode, the number of constituent PRBs and frequency position or A/N resource offset to determine an A/N resource when control information is transmitted with the E-PDCCH set or the like. The number of E-PDCCH sets to be set may be one or plural.

Step (2): Base station 100 determines terminal 200 for assignment of data in each subframe and performs scheduling within the PDSCH. The scheduling uses the CSI feedback or sounding reference signal (SRS) transmitted by terminal 200 and the like in addition to the amount of traffic to each terminal 200.

Step (3): Base station 100 generates control information including the PDSCH scheduling result intended for each terminal 200 and schedules the control information onto PDCCH or E-PDCCH. For terminal 200 for which a plurality of E-PDCCH sets are set, base station 100 determines an E-PDCCH set for transmitting control information and schedules the control information in the E-PDCCH set.

Base station 100 confirms whether or not collision of A/N resources occurs among all terminals 200 onto which control information is scheduled. When collision of A/N resources occurs, base station 100 performs scheduling over again so as not to cause collision. Alternatively, base station 100 leaves one terminal 200 among colliding terminals 200 and abandons the scheduling of other terminals 200 (allocation block).

Step (4): When scheduling of the control information mapping for all terminals 200 is completed, base station 100 transmits, by radio, PDCCH and E-PDCCH and PDSCH downlink data using the downlink.

Step (5): Terminal 200 obtains from the received signal the control information intended for terminal 200 and extracts and decodes the data signal. Particularly for terminal 200 to which control information is possibly transmitted on E-PDCCH, base station 100 performs blind detection on one or a plurality of E-PDCCH sets that can be used. Upon detecting control information, terminal 200 identifies a resource having a code and a frequency for transmitting an A/N signal corresponding to the received data signal. E-PDCCH terminal 200 in particular obtains an A/N resource index according to a predefined rule (e.g., equation 2) based on setting information of the E-PDCCH set by which control information intended for terminal 200 is transmitted and an eCCE number having the smallest index for which control information is scheduled.

Step (6): Terminal 200 identifies ACK or NACK in accordance with the data signal determination result and transmits the A/N signal using an A/N resource (code and frequency resource) identified as noted above.

[Effects]

Figure 17:
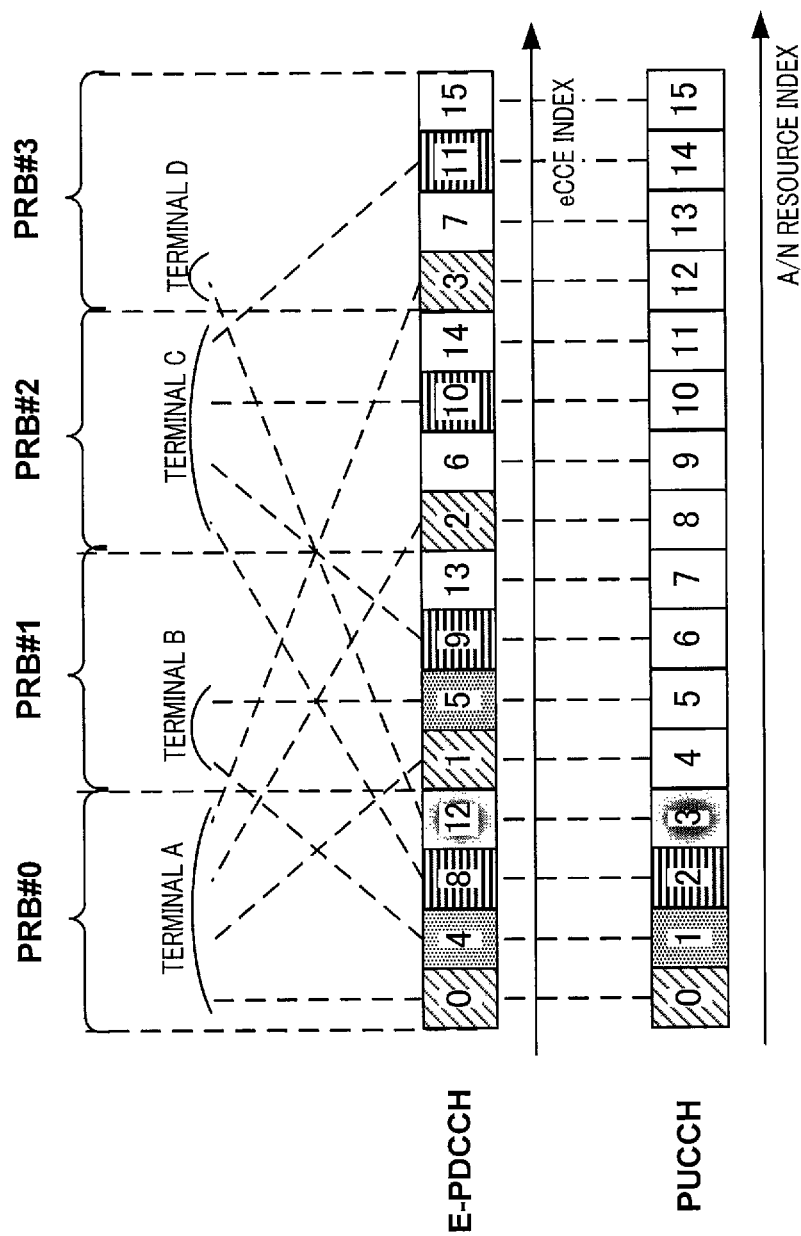
FIG. 17 is a drawing showing a relationship between eCCE indexes and A/N resource indexes according to Embodiment 2 when four terminals are allocated by E-PDCCH.

According to base station 100 and terminal 200 of Embodiment 2, it is possible to distribute eCCE indexes corresponding to consecutive A/N resource numbers over different PRBs on E-PDCCH in a localized mode. FIG. 17 illustrates an example where the eCCE numbering described in Embodiment 2 is performed and control information of four terminals is accommodated in E-PDCCH. It is possible to distribute control information of different terminals included in the E-PDCCH set over eCCEs of different PRBs while concentrating A/N resources of a plurality of different terminals on small indexes.

Meanwhile, in Embodiment 2, since eCCEs having consecutive numbers are arranged on different PRBs, when control information of each terminal is constructed of two or more eCCEs, the control information is transmitted in a plurality of PRBs. Therefore, by changing the number of eCCEs used for transmission of control information, it is possible to flexibly achieve a tradeoff between the frequency scheduling effect (when the number of eCCEs is large) and the frequency scheduling effect (when the number of eCCEs is small).

The embodiments of the present invention have been described thus far.

In the embodiments described above, the present invention is described using an example of a case where the present invention is implemented as hardware. However, the present invention can be achieved by software in concert with hardware.

The functional blocks described in the embodiments described above are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

As described above, a radio communication terminal according to each of the embodiments includes: a receiving section that receives a control signal via an enhanced physical downlink control channel; a control section that determines an ACK/NACK resource for transmitting an ACK/NACK signal based on an association rule according to which, in the enhanced physical downlink control channel for transmitting each enhanced control channel element in a single frequency resource block, optional consecutive numbers of ACK/NACK resources are associated with the enhanced control channel elements included in different frequency resource blocks; and a transmitting section that transmits the ACK/NACK signal using the determined ACK/NACK resource.

When a localized mode is used in which each enhanced control channel element is included in a single frequency resource block, this allows consecutive ACK/NACK resources to be associated with enhanced control channel element indexes of different frequency resource blocks. Thus, even when ACK/NACK resources of a plurality of terminals are concentrated around a specific resource number, it is possible to schedule control information among terminals onto different frequency resource blocks and achieve a high frequency scheduling effect.

A base station apparatus according to each of the embodiments includes: a receiving section that receives an ACK/NACK signal transmitted by a radio communication terminal; a control section that determines, when transmitting each enhanced control channel element for a control signal to the radio communication terminal using a single frequency resource block, an ACK/NACK resource based on an association rule according to which optional consecutive numbers of ACK/NACK resources are associated with an enhanced physical downlink control channel included in different frequency resource blocks, and that schedules a control signal onto the enhanced physical downlink control channel; and a transmitting section that transmits the control signal.

Thus, in the localized mode in which each enhanced control channel element is included in a single frequency resource block, the base station apparatus can flexibly perform frequency scheduling among terminals even when ACK/NACK resources around a specific index are used intensively.

A resource allocation method according to each of the embodiments includes: assigning numbers so that, in an enhanced physical downlink control channel for transmitting each enhanced control channel element making up a control signal in a single frequency resource block, consecutive numbers of the enhanced control channel elements are included in an identical or a nearest settable frequency resource block; and making a determination based on an association rule according to which optional consecutive numbers of ACK/NACK resources are associated with the enhanced control channel elements included in different frequency resource blocks.

Thus, in the localized mode in which each enhanced control channel element is included in a single frequency resource block, the radio communication base station can achieve a high frequency scheduling effect.

The disclosure of Japanese Patent Application No. 2012-214975, filed on Sep. 27, 2012, including the specification, drawings and abstract is incorporated herein by reference in its entirety.

INDUSTRIAL APPLICABILITY

The present invention can be applied to a radio communication terminal, a base station apparatus, a resource allocation method, and the like of a mobile communication system.

REFERENCE SIGNS LIST

11 Antenna
12 Control information generation section
13 Control information coding section
14, 17 Modulation section
15 Data coding section
16 Retransmission control section
18 Subframe configuration section
19 IFFT section
20 CP adding section
21 Radio transmitting section
22 Radio receiving section
23 CP removal section
24 Despreading section
25 Correlation processing section
26 Determination section
41 Antenna
42 Radio receiving section
43 CP removal section
44 FFT section
45 Extraction section
46 Data demodulation section
47 Data decoding section
48 Determination section
49 Control information demodulation section
50 Control information decoding section
51 Control information determination section
52 Control processing section
53 A/N signal modulation section
54 Primary spreading section
55, 60 IFFT section
56 CP adding section
57 Secondary spreading section
58 Multiplexing section
59 Radio transmitting section
61 CP adding section
62 Spreading section
100 Base station
110 Control section
120 Transmitting section
200 Terminal
210 Transmitting section
220 Control section
230 Receiving section

The invention claimed is:

1. A radio communication terminal comprising:
a receiver, which, in operation, receives a control signal via an enhanced physical downlink control channel (E-PDCCH), wherein the E-PDCCH is mapped to two or more frequency resource blocks and each frequency resource block includes one or more consecutive numbers of enhanced control channel elements (eCCEs);
a controller, which, in operation, determines an ACK/NACK resource for use in transmitting an ACK/NACK signal based on an association rule, wherein the association rule associates two consecutive numbers of ACK/NACK resources with the eCCEs, which are not consecutive and are included in two different frequency resource blocks, respectively; and
a transmitter, which, in operation, transmits the ACK/NACK signal using the determined ACK/NACK resource.

2. A base station apparatus comprising:
a transmitter, which, in operation, transmits a control signal via an enhanced physical downlink control channel (E-PDCCH) to a radio communication terminal, wherein the E-PDCCH is mapped to two or more frequency resource blocks and each frequency resource block includes one or more consecutive numbers of enhanced control channel elements(eCCEs); and
a receiver, which, in operation, receives from the radio communication terminal an ACK/NACK signal in an ACK/NACK resource determined based on an association rule, wherein the association rule associates two consecutive numbers of ACK/NACK resources with the eCCEs, which are not consecutive and are included in two different frequency resource blocks, respectively.

3. A method executed by a radio communication terminal, the method comprising:
receiving a control signal via an enhanced physical downlink control channel (E-PDCCH), wherein the E-PDCCH is mapped to two or more frequency resource blocks and each frequency resource block includes one or more consecutive numbers of enhanced control channel elements (eCCEs);

determining an ACK/NACK resource for use in transmitting an ACK/NACK signal based on an association rule, wherein the association rule associates two consecutive numbers of ACK/NACK resources with the eCCEs, which are not consecutive and are included in two different frequency resource blocks, respectively; and transmitting the ACK/NACK signal using the determined ACK/NACK resource.

4. The radio communication terminal of claim 1, wherein the controller, in operation, multiplies the ACK/NACK signal with a cyclic-shifted sequence.

5. The radio communication terminal of claim 4, wherein the controller, in operation, multiplies the ACK/NACK signal with an orthogonal sequence.

6. The radio communication terminal of claim 1, wherein the controller, in operation, determines the ACK/NACK resource having a number that corresponds to the smallest number of consecutive numbers of eCCEs used to receive the control signal as the ACK/NACK resource for transmitting the ACK/NACK signal.

7. The radio communication terminal of claim 6, wherein the controller, in operation, determines the ACK/NACK resource based on an offset value signaled from a higher layer.

8. The base station apparatus of claim 1, wherein each of the eCCEs is localized in a single frequency resource block in the E-PDCCH.

9. The base station apparatus of claim 2, wherein the ACK/NACK signal is multiplied with a cyclic-shifted sequence.

10. The base station apparatus of claim 9, wherein the ACK/NACK signal is multiplied with an orthogonal sequence.

11. The base station apparatus of claim 2, wherein the ACK/NACK resource used to receive the ACK/NACK signal has a number that corresponds to the smallest number of consecutive numbers of eCCEs used to transmit the control signal.

12. The base station apparatus of claim 11, wherein the ACK/NACK resource is determined based on an offset value signaled from a higher layer.

13. The base station apparatus of claim 2, wherein each of the eCCEs is localized in a single frequency resource block in the E-PDCCH.

14. The method of claim 3, further comprising multiplying the ACK/NACK signal with a cyclic-shifted sequence.

15. The method of claim 14, further comprising multiplying the ACK/NACK signal with an orthogonal sequence.

16. The method of claim 3, wherein the ACK/NACK resource having a number that corresponds to the smallest number of consecutive numbers of eCCEs used to receive the control signal is determined as the ACK/NACK resource for transmitting the ACK/NACK signal.

17. The method of claim 16, wherein the ACK/NACK resource is determined based on an offset value signaled from a higher layer.

18. The method of claim 3, wherein each of the eCCEs is localized in a single frequency resource block in the E-PDCCH.

* * * * *